Nov. 24, 1936. W. H. BENDALL 2,062,115
POWER TRANSMISSION CHAIN DRIVE
Filed Jan. 23, 1934  2 Sheets-Sheet 1
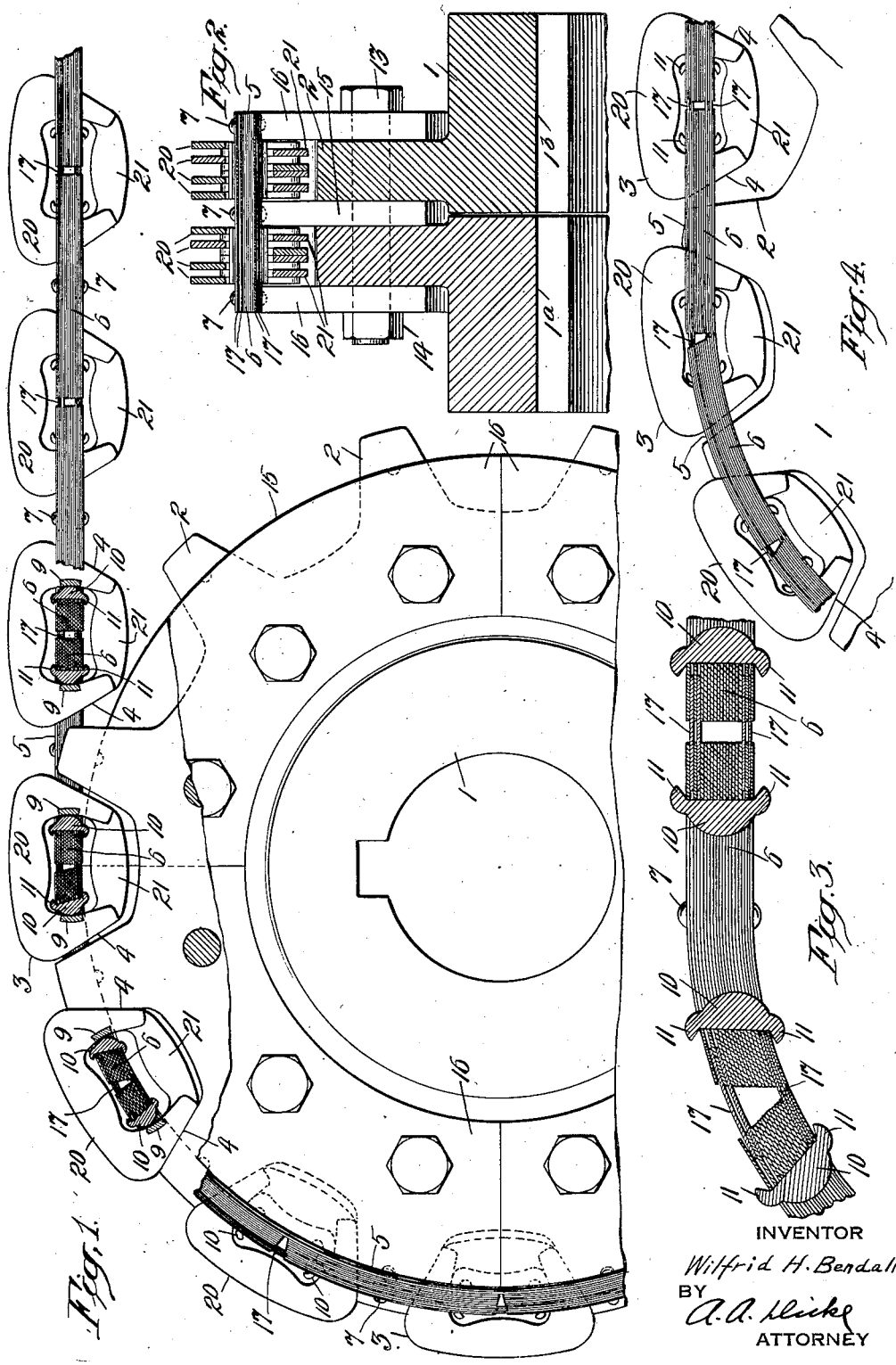
INVENTOR
Wilfrid H. Bendall
BY
ATTORNEY

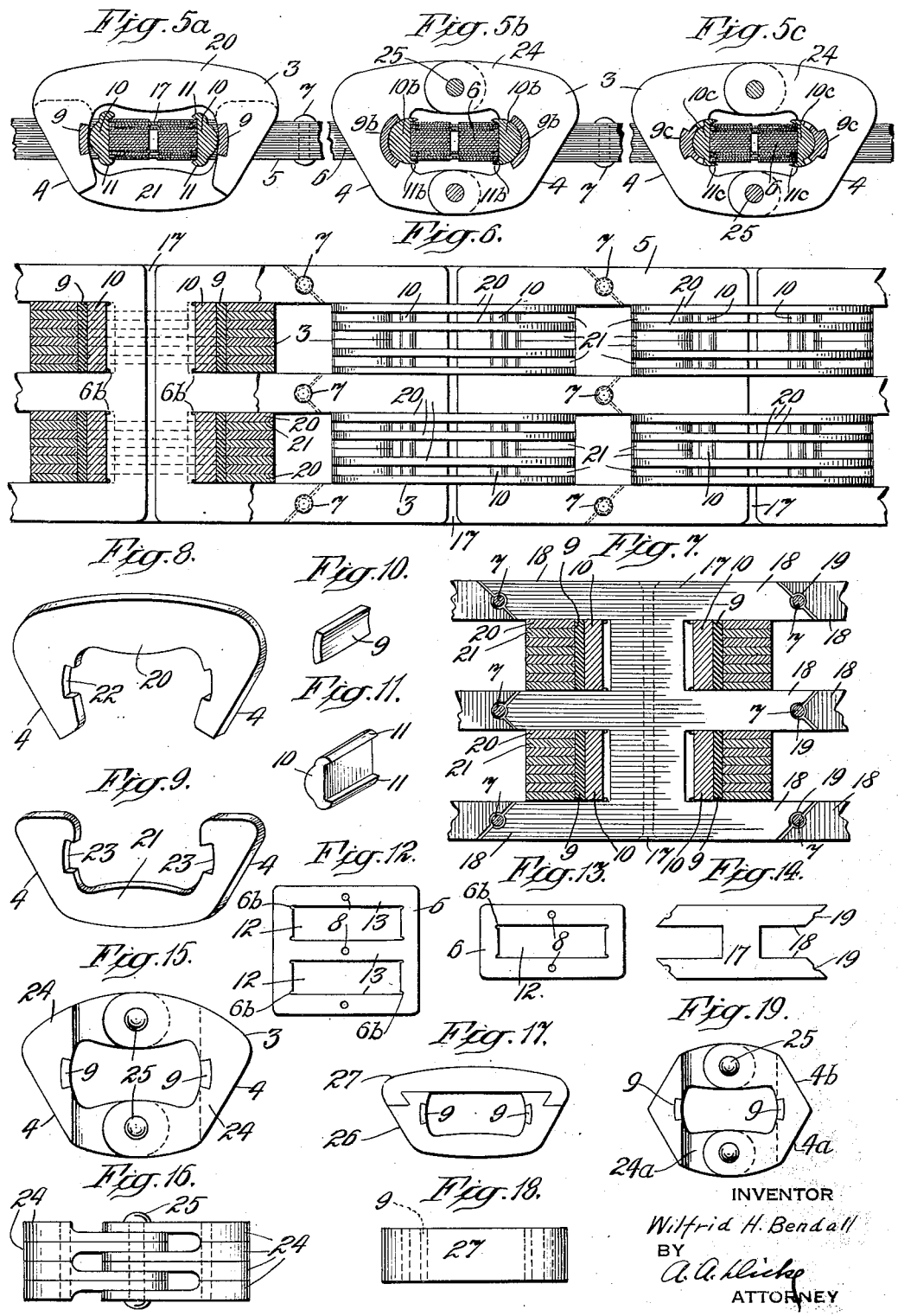

Patented Nov. 24, 1936

2,062,115

UNITED STATES PATENT OFFICE 2,062,115

POWER TRANSMISSION CHAIN DRIVE

Wilfrid H. Bendall, Long Island City, N. Y.

Application January 23, 1934, Serial No. 707,891

16 Claims. (Cl. 74—245)

This invention relates to power transmission chain drives and pertains generally to the class of power transmitting devices which comprises elements designed to positively engage toothed sprocket wheels mounted respectively on driving and driven shafts whereby power may be delivered from the driving to the driven shaft. Among the desiderata of such devices, is that the chain parts move into engagement with the sprocket wheels smoothly and silently, even at high speeds, that the chain drive is operable for long periods without excessive wear, and that the angular velocity ratio between the driving and driven sprockets be uniform; which requirements are not met by existing types of chain drives.

For a more complete understanding of the shortcomings of present chain drives, reference is made to three articles appearing, respectively, in the April, June, and July 1931 numbers of "Product Engineering", published by the McGraw-Hill Publishing Company of New York, by Professor G. M. Bartlett of Purdue University.

Some of the objections to the rigid link chain drives, as heretofore made, will be briefly enumerated. An inherent limitation of rigid link chains lies in the fact that the pitch-lines of the drive sprocket are essentially polygonal. During the passage of each link, or of each transverse group of links in the case of multiple strand chain drives, onto the sprocket, the distance of the pitch-line of the chain from the center of the sprocket varies by an amount which corresponds to the height of a segment defined by a cord equal in length to the rigid link of given pitch, the ends or centers of articulation of said links appearing as the vertices of an inscribed polygon having as many sides as there are teeth in a given sprocket. The midpoint height of said segment defines the limits between which the drive strand of the chain is forced to fluctuate during the passage of each link upon the sprocket. At and above certain definitely limited speeds for given sprocket and pitch combinations, this periodical variation in effective radius of the drive sprockets makes smooth operation and quiet durable installation impossible.

The reasons for this are well set forth in Professor Bartlett's articles referred to. Among these are that the contact of each link with the sprocket is not made gradually, but at a considerable relative velocity, resulting in shock or impact to an extent absolutely intolerable at higher speeds. Furthermore, the chain strands where they pass onto and off the sprockets are given a whipping motion, due to variation in effective radius, which movement vibrates the chain and transmits a wave toward the opposite end of the chain strand resulting in further excessive vibration and strain. A further difficulty is the great fluctuation in angular velocity ratio inherent in all rigid link chain drives. This is particularly noticeable and objectionable in installations where the tangential distance between sprockets is equal to an odd multiple of the one-half pitch. In such an installation the effective radius of one sprocket is at a maximum when the effective radius of the other sprocket is at a minimum, and vice-versa. According to Professor Bartlett's computation the variation in angular velocity in such an installation, where the driving and driven sprockets each have six teeth, will be as great as 33.3% (June 1931, Product Engineering, page 254). It will be quite obvious that where both driving and driven sprockets are connected to rotating members having substantial mass such an installation could operate only very ineffectively and with very great stress upon the chain and sprockets, resulting in extremely rapid wear. By making the tangential distance between the sprockets equal to an integral number of pitches the velocity fluctuation can be reduced, but the incidental rise and fall of the strand is accentuated, as a result of which the potential power transmitting capacity of the mechanism is very much reduced.

Further objections to rigid link chains result from the characteristic impact between chain links and sprockets, which is an equally important limiting factor. In the case of roller chains, the rigid link structure is heavier than in the case of plain rigid link chains for the same capacity, so that under the same operating conditions, the destructive forces, due to impact, are still greater.

It is an object of the present invention to overcome the disadvantages inherent in rigid link power transmission chain drives by the provision of flexible links so constructed as to be capable of conforming to a continuous circular pitch-line. The resultant elimination of fluctuation of effective radius of the sprockets reduces vibration, eliminates impact, provides uniform angular velocity ratios, and thereby increases the specific capacity, and eliminates wear due to impact, shock and vibration.

A further object is to provide a power transmission chain comprising two separate and related parts, a flexible chain link and a chain tooth which separately achieve their respective functions without generating objectionable kinematic effects as is the case with rigid chains in which the articulation of the rigid links in meshing with the sprockets affects the strand which is transmitting the tension load.

Another object is to provide a flexible chain link composed of a plurality of relatively thin laminae whereby a great degree of flexing is permitted without subjecting the fibers thereof to excessive stress.

Another object is to provide a transmission chain in which the bearings between the several parts thereof reduce friction in operation by utilizing rolling contact action between the parts thereof thus reducing wear and the resulting tendency to elongation.

Another object is to provide such a chain so constructed that it is not restricted to flexure in one direction when transmitting power so that sprockets may engage either face of a given chain at the same time, the direction of rotation of one or more sprockets thus being reversed while meshing with a single chain.

Another object is to provide a simple means for adjusting the effective pitch diameter of the sprockets so as to enable restoration of the smoothness of action when, after long service, elongation of the chain begins to affect the efficiency of the transmission.

Another object is the provision in such a chain of rigid sprocket engaging means which serve also as a link, i. e. for interconnecting the flexible links and transmitting tension from each flexible link to adjacent flexible links.

A further object is to provide means for assuring uniformity of curvature of the flexible links in those parts thereof which are adjacent the rigid links, as by the provision of bridging interleaves.

Another object is to provide a chain drive in which the sprocket teeth engaging members are movable relative to the pitch-line of the chain as an incident to the bending of the chain upon the sprocket wheel so that these members are gradually seated within the space between the sprocket teeth.

A further object is to provide a transmission chain which is economical to manufacture, is relatively light in weight in comparison to its power transmitting capacity, and which will permit of smooth operation even though utilizing a relatively large pitch.

These objects are realized in the present invention, several embodiments of which are shown in the attached drawings, in which:

Fig. 1 is a partially broken away side elevation of the chain drive, certain parts being shown in section;

Fig. 2 is a vertical section through the sprocket wheel and chain of Fig. 1;

Fig. 3 is an enlarged longitudinal sectional view of part of the chain shown in Fig. 1, the rigid links being omitted;

Fig. 4 is a partial view of the chain drive with a modified flexible link construction;

Fig. 5a is an enlarged view of the form of link shown in Fig. 1 in which rolling contact between the parts is provided;

Fig. 5b shows a modified form of link provided with a sliding contact bearing;

Fig. 5c shows a link similar to Fig. 5b with a sliding contact bearing of smaller diameter;

Fig. 6 is a plan view of a multiple link chain partially in section;

Fig. 7 is an enlarged broken away section of a portion of the chain shown in Fig. 6 showing the bridging interleaved construction;

Figs. 8 and 9 are perspective views of the component parts of the rigid tooth structure of the form shown in Figs. 1, 4, and 5a.

Fig. 10 is a perspective view of the hardened bearing insert rigidly attached to the rigid teeth;

Fig. 11 is a perspective view of the cooperating rocker member adapted to lie between the flexible and rigid tooth links;

Figs. 12 and 13 show flexible link laminae of the multiple and single type respectively;

Fig. 14 is a plan view of one of the bridging laminae for interleaving with the single type link of Fig. 13;

Figs. 15 and 16 are side and plan views respectively, of a modified construction for the rigid tooth links;

Figs. 17 and 18 show a further modification of rigid tooth link; and

Fig. 19 is a side view of a form of rigid link having both its upper and its lower face adapted to engage with one or more sprocket wheels so as to permit the rotation of one or more sprockets in opposite directions while meshing with a single chain.

Referring to the drawings, it will be understood that the chain drive of the present improvement is arranged to cooperate with a driving and a driven sprocket gear, one of which is represented in Figs. 1 and 2, the gear wheel 1 being provided with a plurality of gear teeth 2, of suitable shape for cooperating with rigid links 3 having their operating edges 4 shaped for proper driving engagement with the teeth 2 of the driving and driven gears.

Each of the rigid links 3 is interconnected with cooperating flexible links 5, which preferably, as indicated in Figs. 1 and 3, comprise a plurality of thin sheet metal laminae 6, two forms of which are shown separately in Figs. 12 and 13. The laminae 6 for the flexible links 5 may ordinarily be secured together by rivets 7, which will form a neutral point or line extending transversely of the flexible links, but rivets may be dispensed with if desired. The laminae 6 shown in Figs. 12 and 13 are provided with holes 8 for the rivets 7.

To reduce friction and to provide a rolling or rocking bearing to take the pull of transmission between the flexible links and the tooth shaped rigid links, hardened plates or bearing members 9 are preferably inserted by dove-tail in the U-shaped assembly of rigid links, as indicated in Figs. 1, 5a, 15 and 17, the operating surface of this bearing member being substantially flat, although to help center the cooperating member a slight curvature is preferable and the member 9 is so shown.

For cooperation with the bearing plate or member 9 of the rigid links, there is provided a rocker member 10, having, in the present instance, a rounded bearing surface to cooperate with the slightly curved face of the hardened plate or member 9. The shape of the cooperating members may be varied as required, the main object being reduction of friction and accommodation of the angle formed by the bearing edges of the flexible links. Each of the rocker bearing members 10 is preferably provided with lugs or lips 11 (see Fig. 11) arranged to extend over the links and prevent the flexible links from leaving the rocker member when the latter is at an angle other than 90° relative to the pitch-line of the chain.

The form of link shown in Fig. 5b provides for a sliding contact bearing instead of a rolling contact bearing. This is accomplished by forming the bearing member 9b with a comparatively small radius of curvature and forming the convex bearing member 10b with approximately the same radius of curvature. The form shown in Fig. 5c is somewhat similar to that of Fig. 5b, but provision is made for a smaller radius of curvature with a resulting reduction in friction losses.

It will be understood that the transmission chain of this improvement may comprise a single line of rigid tooth links 3 cooperating with single aperture flexible links formed of laminae as shown in Fig. 13, but preferably multi-apertured, webbed links formed of webbed laminae, as shown in Fig. 12 are to be used, the power which may be transmitted being in part determined by the width of the links and number of webs, a double width chain for example, being indicated in Figs. 2, 6 and 7. In any form or width of chain, it will be understood that the rigid links 3 are arranged to engage the flexible links 5 in the apertures 12 or in laterally spaced openings 12 between the webs 13. It will also be understood that in each of the apertures or openings 12 there is provided a corresponding plurality of cooperating bearing members 9 and 10.

In the multi-webbed construction of the transmission chain, a plurality of laterally segregated assemblies of rigid gear tooth links are shown, the separate elements being spaced apart laterally the same as the openings 12 in the flexible links 5; and, obviously for operation with such a multi-webbed chain correspondingly spaced driving and driven gears will be required. Two such gears spaced apart and cooperating with a double width chain is indicated in Fig. 2 where it will be seen that the gear comprises two sections or parts 1a and 1b secured together as by bolts and nuts 13 and 14, although, obviously, the gear construction may be of other suitable form or arrangement. A plurality of separated gears assembled in the manner indicated, however, is considered preferable in the present instance, in order to provide for the mounting therewith of circular tracks 15 to support the flexible links 5 around the gear wheel 1 so as to maintain the line of transmission substantially in the pitch circle of the gears. As indicated in Fig. 1, the chain link supporting track is formed of a plurality of annular segments 16, mounted, as indicated in Fig. 2, on the outside of the compound sprocket gear and between the two sections 1a and 1b thereof, these annular segments being secured to the outside and between the gears to form a rigid structure, by the bolts and nuts 13—14.

It should be understood that, in the present instance, the circular track 15, forming the periphery of the annular segments 16, is primarily arranged for a given width and pitch of flexible links for the transmission chain, so that the pitch-line of the flexible links 5 and the rigid links 3 will coincide with the pitch circle of the gear wheel. The segmental construction of the track, however, and the bolted attachment of the segments 16 to the gears 1, provides a ready means for exchanging track segments to vary the diameter of the track, so that in case of wear and stretching of the transmission chain new segmental tracks 15—16 may be supplied to restore the original chain performance at a slightly higher point on the sprocket teeth.

The laminated links 5, in cooperation with the circular tracks 15, may be sufficient to provide continuous uniform curvature of the transmission chain as it is carried around the gears, but under other conditions it may be desirable to insure a more continuous curvature of the flexible links by utilizing a plurality of bridging laminae 17 interleaved with the top and bottom laminae 6 of the flexible links 5, as indicated in the drawings, see particularly the enlarged view of Fig. 3. The interleaved bridging laminae 17 are also shown in Figs. 1 and 5, and are shown and indicated by dotted lines in the plan view Fig. 6.

Fig. 7 more particularly shows a plan view of the double width chain with rigid links in section, showing the joint between two contiguous flexible links, with the bridging pieces 17, which, as will be seen, are provided with outwardly extending fingers 18 coinciding with the webs 13 of the double flexible link laminae. These fingers 18 of the bridging members 17 preferably may be provided with angular ends with notches or semi-circular openings 19 to clear the rivets 7, forming the neutral point of the flexible links, substantially as indicated in Figs. 6 and 7, but any other suitable arrangement may be used.

A similar bridging piece 17 with fingers 18 for the transmission links having a single opening like the laminae in Fig. 13 is shown in Fig. 14. In either form the fingers 18 of the bridging links extend along the sides of the rigid links 3 so that they are held in place laterally and in both, when taking the curvature of the tracks 15, the fingers 18 of the bridging pieces 17 slide longitudinally of the web portions of the flexible links 5. The laminae of the flexible links in conforming to the curve of the tracks 15, as indicated in Figs. 1 and 3, will be separated more at the outer periphery than the ends of the lower laminae, but this space is covered by the bridging pieces 17, which control the curvature of the ends of the laminae. The rivets 7 of the flexible links should be and are (when bridging pieces are used) set loose enough to accommodate the bridging pieces 17 and permit the sliding movement thereof.

For varying the flexibility of the transmission drive the number and thickness of the laminae in the flexible links 5 may be varied, and the thickness may vary from say three thousandths (.003) upward according to requirements. Also it will be understood that any suitable material available or required may be used, for example sheet steel and other alloys, and these may be of any suitable thickness. It will also be understood that the rigid links may be of laminated sheet metal, fiber or other suitable material, castings or forgings, as may be desired, but preferably a plurality of laminae 20 are assembled with a number of interleaved yoke pieces 20—21 (see Figs. 8 and 9), which together form the rigid links 3, shown in Figs. 1, 5, 6 and 7. In this form of construction for the rigid links, the hardened bearing plates or members 9 are driven into or mounted on dove-tail notches 22 and 23, so as to lock or hold the assembled rigid link laminae together, as indicated by the links 3 in Figs. 1, 5 and 6.

A modified form for the rigid links is represented in Figs. 5b, 5c, 15, 16 and 17, wherein a plurality of U-shaped members 24 which may be formed with off-set shoulder portions are assembled with the stems of the U-members extending in opposite directions and interleaved so as to be secured together by rivets 25 to form the rigid links. In this form, the bearing plates or members 9 are inserted in dove-tail grooves (same as 22 and 23) substantially as with the form in Figs. 8 and 9. Both of these constructions make it possible for the rigid links to be separated or assembled in order to change or insert the flexible links.

Another modification for the rigid links is shown in Figs. 17 and 18, wherein the lower yoke piece 26 is formed as a forging, casting or the like of solid material in which the bearing members 9 are similarly located in dove-tail grooves. To close the link a cap member 27 is preferably provided with undercut lugs adapted to cooperate with and slide over undercut grooves formed on the upper portion of the tooth-shaped link member 26, as will be seen in Fig. 17. In Fig. 19 is shown a form of rigid link similar to that of Figs. 15 and 16 but formed with duplex faces for use in duplex chain i. e., a chain so designed that both faces thereof may cooperate with sprocket wheels.

Although the links 3 have been referred to as rigid this should be understood as comparative with the links 5 and not as limiting. The links 3 may indeed be made quite flexible or may be made of a number of parts rigidly or otherwise connected together.

In the form of transmission chain shown in Figs. 1, 5, 6, and 7, it has been pointed out that a neutral point is provided transversely and central of the flexible links 5, by the insertion of rivets 7, but it has been found that, under some conditions it may be desirable to omit them, and accordingly, as shown in Fig. 4, the laminae 6 may be assembled in the links 3 without rivets or other device for establishing a neutral point.

Referring to Fig. 1 the chain is shown engaging a drive sprocket 2, the horizontal or free portion of the chain being represented as under load. The three free rigid links are shown as parallel to the flexible links 6. It will be noted, however, that the rigid link which is immediately above the center of the sprocket, is tilted slightly to the left; this is due to the counter-clockwise rocking of the rocker member 10 caused by the relative movement of the laminae of the preceding flexible link with the result that the ends of said laminae lie in a plane at an angle inclined to the vertical which plane serves to control the position of said rocker 10. It will be noted, however, that as the rigid link moves further onto the sprocket, and the following flexible link conforms to the curvature of the track 15, the other rocker cooperating with said rigid link is caused to rock similarly so that the trailing end of the flexible link is moved downwardly, i. e. toward the center of the sprocket. From this it will be seen that the rigid links do not make a tangential approach to the sprocket wheel, but said approach is modified by the rocking action of rockers 10 so that the rigid link members are gradually and smoothly seated within the space between the sprocket teeth 2.

In the form shown in Figs. 5b and 5c, this rocking action is absent because the members 10b, and 10c slide relatively to the links 24 so that no relative up-and-down motion between rockers 10 and links 24 can occur.

In the form shown in Fig. 4 the laminae assume slightly different positions as the links pass from the straight to the curved positions, as indicated in that figure, but, as in the previously described arrangement, bridging members or laminae 17 may be employed to hold the ends of the flexible links to the curvature of the tracks 15. But obviously, when conditions and the construction permits, the bridging links may be dispensed with.

As indicated at 6b in Figs. 6, 12 and 13 it may be desirable to provide indentations in the inner corners of the laminae 6. If this is done the sections between said indentations will form short struts. If through error in manufacture the openings in the laminae are of slightly different length the said strut sections of the shorter links may buckle slightly so that all of the laminae will bear, so that the load will not be concentrated on the shorter laminae. Furthermore, in the event the driving and driven sprockets are poorly aligned, as when the shafts are not parallel, these strut portions will buckle slightly at one end and thus compensate for such misalignment.

While the preferred form of the improvement has been described, it will be understood that, without departing from the spirit and scope of the invention, various modifications therein may be made either in form and construction of the rigid or the flexible links and/or in the position and arrangement of the cooperating sprocket gear wheels.

I claim:

1. A flexible link chain drive comprising a gear wheel, a plurality of rigid links formed for co-operation with the teeth of said gear wheel, flexible links formed of laminae interconnecting said rigid links, hardened bearing members at opposite ends of said rigid links, hardened bearing members embracing the laminae at the ends of the flexible links, the respective bearing members being in mutual engagement for rocking movement, and means for holding said bearing members operatively connected to the respective links.

2. A flexible link chain drive comprising a gear wheel, rigid chain links shaped for cooperation with sprocket teeth of said wheel, flexible links interconnecting said rigid links and formed of a plurality of thin laminae, means for securing said laminae together, said means forming a neutral point substantially mid-way of the ends of the flexible links, means cooperating with said flexible links to maintain uniform curvature of the chain relative to the pitch circle of the wheel, and hardened bearing members in rocking engagement between said rigid links and the flexible links, said bearing members being arranged to maintain the rigid links in substantially uniform tooth pitch relation with said sprocket wheel as the flexible links take the curvature of the sprocket wheel whereby the pitch radius of the chain on the sprocket remains constant.

3. A flexible link chain drive comprising rigid links interconnected with flexible links, said rigid links comprising a plurality of plates having their outer working edges formed for cooperation with sprocket teeth, said flexible links comprising a plurality of laminae, the planes of the flexible link laminae being at right angles to the planes of said rigid link plates.

4. A flexible link chain drive having rigid links comprising a plurality of plates the outer working edges of which are shaped for cooperation with sprocket teeth, means for aligning and holding said plates together, flexible links interconnecting said rigid links, said flexible links comprising a plurality of laminae, means for holding the laminae of the links together so that contiguous links flex together and cooperating bearing members interposed between said flexible links and the rigid links.

5. A flexible link chain drive comprising a plurality of rigid links, a plurality of flexible links interconnecting said rigid links, said flexible links being formed of a plurality of thin substantially flat plates and interleaved flexible metal members between and cooperating with adjacent ends of said flexible links so as to maintain curvilinear interconnection between the adjacent ends of successive links.

6. A flexible link chain drive comprising rigid links, flexible laminated metal links embodying a plurality of substantially flat plates interconnecting said rigid links, said rigid links comprising separable U-shaped members to facilitate interconnecting the flexible links therewith and means for enclosing the open sides of said U-shaped links.

7. A flexible link chain drive comprising rigid links shaped for cooperation with sprocket teeth, flexible links comprising a plurality of thin metal laminae interconnecting said rigid links, a sprocket wheel for cooperation with said chain, circular track members associated with said gear wheel and cooperating with said flexible links to maintain said tooth links in proper relation to the pitch circle of the gear and means for detachably securing said track members to said gear wheel.

8. The flexible link chain drive as in claim 7, in which said circular track members are arranged to be bolted to the gear wheel so as to be removable therefrom, whereby track members of different diameter may be substituted to vary the effective diameter of said tracks.

9. The flexible link chain drive as in claim 7, in which a plurality of rows of rigid links are arranged to cooperate with a plurality of laterally spaced sprocket wheels and the laminae of the flexible links are provided with a plurality of openings corresponding with the rows of rigid links for cooperation therewith, and the number of said circular track members is one greater than the plurality of rows of rigid links.

10. A flexible link chain drive comprising a plurality of laterally spaced sprocket wheels, a plurality of laterally spaced rigid links shaped to cooperate with the sprocket teeth of said wheels, laterally extending flexible links provided with openings defined by a plurality of laterally spaced webs, said rigid links being arranged in said openings to interconnect with the flexible links which are formed of a plurality of laminae, thin laminae interleaved between and bridging the laminae of adjacent flexible links, said bridging laminae being provided with fingers coinciding with said webs, hardened bearing members carried by the respective rigid links and hardened bearing members in each opening of the flexible links, said bearing members being arranged to take the tension of transmission and to move one upon the other so that the chain will take the curve of the gear with the pitch-line of said chain concentric with said sprocket wheel.

11. A flexible link chain drive comprising flexible ring-shaped links, the central aperture of said links being adapted to admit sprocket teeth, and ring-shaped rigid links connecting the flexible links, the plane of the rigid links adapted to lie in the general plane of said sprocket, the outer working edges of the rigid links being adapted to engage the sides of the sprocket teeth.

12. A flexible link chain drive comprising flexible ring-shaped links, the central apertures of said links being adapted to admit sprocket teeth, and ring-shaped rigid links connecting the flexible links, the outer working edges of the rigid links being adapted to engage the sides of the sprocket teeth, the inner edges of the rigid links being in a rocking engagement with the inner edges of the flexible links.

13. A flexible link chain drive comprising flexible flat links perforated in the middle for sprocket teeth, and ring-shaped rigid links connecting the flexible links at right angles thereto, the inner edges of the rigid links being in a rocking engagement with the inner edges of the flexible links.

14. A flexible link chain drive comprising flexible links consisting of a plurality of flat plates perforated so as to admit sprocket teeth and joined together at the middle neutral points, ring-shaped rigid links connecting the flexible links substantially at right angles thereto, the inner edges of the rigid links being in a rocking engagement with the inner edges of the flexible links, and means to uniformly transmit the pressure to the edges of individual flexible plates.

15. A flexible link chain drive as set forth in claim 11, characterized in that the rigid links are formed of separable interlocking portions.

16. A flexible link chain drive as set forth in claim 13 characterized in that the flexible links are adapted to follow the curvature of the round portions of a sprocket wheel at the sides of its teeth.

WILFRID H. BENDALL.